US007118441B2

(12) United States Patent
Kifune et al.

(10) Patent No.: US 7,118,441 B2
(45) Date of Patent: Oct. 10, 2006

(54) METHOD AND APPARATUS FOR MANUFACTURING PLASMA DISPLAY PANEL

(75) Inventors: Motonari Kifune, Kawasaki (JP); Hideki Okano, Kawasaki (JP)

(73) Assignee: Fujitsu Hitachi Plasma Display Limited, Kawasaki (JP)

( * ) Notice: Subject to any disclaimer, the term of this patent is extended or adjusted under 35 U.S.C. 154(b) by 8 days.

(21) Appl. No.: 10/914,240

(22) Filed: Aug. 10, 2004

(65) Prior Publication Data

US 2005/0048861 A1 Mar. 3, 2005

(30) Foreign Application Priority Data

Aug. 25, 2003 (JP) ............................ 2003-208631

(51) Int. Cl.
*G01J 9/38* (2006.01)

(52) U.S. Cl. .......................................... 445/70; 445/60

(58) Field of Classification Search .................. 445/70, 445/73, 66, 53–55, 6, 60
See application file for complete search history.

(56) References Cited

U.S. PATENT DOCUMENTS

| | | | | |
|---|---|---|---|---|
| 5,433,639 | A * | 7/1995 | Zahuta et al. | 445/40 |
| 5,763,998 | A * | 6/1998 | Colombo et al. | 313/495 |
| 6,189,579 | B1 * | 2/2001 | Tanaka | 141/8 |
| 6,817,917 | B1 * | 11/2004 | Kado et al. | 445/25 |

FOREIGN PATENT DOCUMENTS

| | | |
|---|---|---|
| JP | 2002-243368 | 8/2002 |

* cited by examiner

*Primary Examiner*—Karabi Guharay
*Assistant Examiner*—Dalei Dong
(74) *Attorney, Agent, or Firm*—Staas & Halsey LLP

(57) ABSTRACT

A method for manufacturing a PDP includes the steps of carrying a PDP under manufacture into an apparatus having a plurality of firing zones, and performing a firing step and/or a drying step under circulating hot air supplied in the respective firing zones. Organic components generated in the firing step and/or the drying step are oxidatively decomposed in a path for circulating the hot air.

9 Claims, 9 Drawing Sheets

METHOD AND APPARATUS FOR MANUFACTURING PLASMA DISPLAY PANEL

CROSS-REFERENCE TO RELATED APPLICATION

This application is related to Japanese Patent Application No. 2003-208631 filed on Aug. 25, 2003, on the basis of which priority is claimed under 35 USC §119, the disclosure of this application being incorporated by reference in its entirety.

BACKGROUND OF THE INVENTION

1. Field of the Invention

The present invention relates to a method for manufacturing a plasma display panel (PDP) having improved firing and/or drying step(s) by forced convection system.

2. Description of Related Art

Conventionally, as an apparatus adopted in a PDP manufacturing method by forced convection system, there is known a flat glass firing oven for firing a dielectric layer, barrier ribs, phosphor layer, and sealing frit formed on a flat glass substrate of the PDP. The dielectric layer, barrier ribs, phosphor layer, and sealing frit are formed by preparing paste or a green sheet containing glass powder and binder resin, and forming the paste or green sheet into a desirable shape to be fired in the firing oven.

As such conventional apparatus for manufacturing the PDP, Japanese Unexamined Patent Publication No. 2002-243368 discloses a continuous firing oven for flat glass substrates shown in FIGS. 8 and 9. In the figures, the conventional continuous firing oven uses a stainless metallic material on its inner surface to have an air-tight structure. The firing oven comprises a plurality of zones in which temperature thereof can be controlled independently of one another. Each zone is connected to a clean air supply pipe 101*a* and an oven atmosphere exhaust pipe 101*b* respectively having a damper 116 for controlling air supply amount and a damper 117 for controlling atmosphere exhaust amount. The temperature inside the zones on loading and discharging sides of the firing oven is not more than 250 to 300° C. At least the zones on the loading side respectively have a baffle 107 provided therein for forming an atmosphere circulation path 109. The atmosphere circulation path 109 is provided with a circulation fan 111 and a heating means 110. The baffle 107 has a heat-resistant filter 112 provided at a circulation atmosphere inlet thereof.

As described above, the conventional continuous firing oven for flat glass substrates has the expensive heat-resistant filter 112 provided only in the zones on the loading side of the oven where a large amount of particles are generated from a resin binder. Since the heat-resistant filter is not provided in other zones, the apparatus is made cheaper.

When the heat-resistant filter 112 is provided in the circulation atmosphere inlet of the baffle 107 as described above, flow resistance increases, and thus ability of the circulation fan 111 needs to be enhanced. However, since the heat-resistant filter 112 is not provided in most of the zones, the circulation fan 111 adopted in the continuous firing oven can be cheap. Further, a flat glass substrate 100 is held horizontally and is fed zone by zone through the firing oven, so that the glass substrate 100 does not fall over two adjacent zones. This allows the glass substrate 100 to be uniformly heated in the oven.

The continuous firing oven for flat glass substrates serving as the conventional manufacturing apparatus for a PDP is constructed as described above, so that the heat-resistant filter provided therein removes particles generated by firing the barrier ribs, phosphor layer, dielectric layer, and sealing frit. However, the continuous firing oven has a problem that it can not remove organic component gas (organic gas) generated from binder resin contained in the barrier ribs, phosphor layer, dielectric layer, and sealing frit at the firing thereof. Further, where the organic component is formed into particles of a predetermined size, a filtration rating of the filter needs to be reduced as the particle size becomes smaller. This increases the flow resistance of the heat-resistance filter, and thereby causing an insufficient supply of hot air in the oven.

Where the filtration rating of the filter is increased so as to have a lower flow resistance, fine particles can not be removed. In other words, where a heating system of the oven is the forced convection system, the organic gas containing unremovable fine particles which are separated and discharged from the flat glass substrate 100 is circulated and introduced into the oven again. Thus, a concentration of the organic component contained in the organic gas in the oven does not settle at a specific level and gradually increases. When the concentration of the organic component in the oven becomes higher, the resin binder contained in the constituents of the PDP (dielectric layer, barrier ribs, phosphor layer, sealing frit) decreases in efficiency of firing decomposition (that is, removal of the resin binder becomes incomplete). Consequently, the resin binder or some of its components remain on the substrate even after the firing, resulting in such problems as decrease in transmittance of the dielectric layer and light-emittance of the phosphor layer.

To lower the concentration of the organic component contained in the organic gas in the oven, a method may be used which introduces a large amount of fresh air into the oven continuously. In such a method, however, extra heat energy needs to be supplied in the oven to compensate the amount of the fresh air introduced in the oven, and this results in poor energy efficiency.

SUMMARY OF THE INVENTION

The present invention has been made in view of the above, and its object is to provide a method for manufacturing a plasma display panel, which ensures the removal of organic gas contained in hot air circulating in the apparatus, and which can remove an organic component contained in the hot air circulating in the apparatus without reducing the amount of the hot air supplied in the apparatus and the heat energy of the hot air.

The present invention provides a method for manufacturing a plasma display panel (PDP) comprising: carrying a PDP under manufacture into an apparatus having a plurality of firing zones; and performing a firing step and/or a drying step under circulating hot air supplied in the respective firing zones, wherein organic components generated in the firing step and/or the drying step are oxidatively decomposed in a path for circulating the hot air.

According to the present invention, the organic components generated at the drying and/or firing of a dielectric layer, barrier ribs, phosphor layer or sealing frit of the PDP are oxidatively decomposed so as to remove the organic component contained in the hot air without reducing an amount of the hot air supplied in the firing zones (i.e., increasing a hot air supply pressure) and reducing heat energy of the hot air.

DESCRIPTION OF THE PREFERRED EMBODIMENTS

Figure 1:
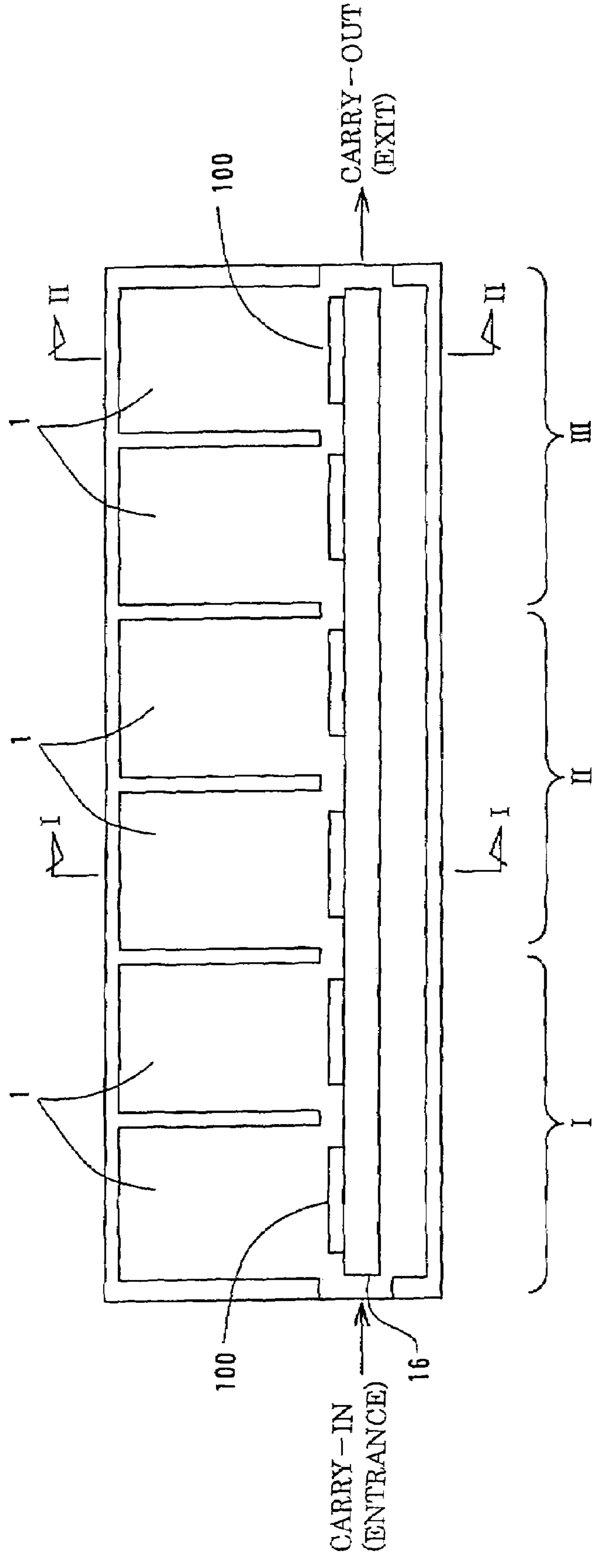
FIG. 1 is a schematic view illustrating an overall construction of a PDP manufacturing apparatus according to a first embodiment of the invention.

In the method of the present invention, the oxidative decomposition of the organic components may be performed in the presence of a catalyst, if desired. By performing the oxidative decomposition of the organic components with the use of the catalyst, a further catalysis is promoted under high temperature conditions in both the firing and drying steps, and thereby the decomposition and removal of the organic components is efficiently conducted.

Further, in the method of the present invention, the plurality of firing zones are distributed into at least a heating region at 200 to 500° C., a high-temperature maintaining region and a cooling region at not higher than 400° C., and the oxidative decomposition of the organic components may be carried out in the heating region, if desired. Since the oxidative decomposition is performed in the heating region at 200 to 500° C., the organic components are removed when it is generated the most. This prevents decrease in firing efficiency caused by the presence of the organic components in the firing zones of a high-temperature maintaining region and a cooling region.

Still further, in the method of the present invention, the plurality of firing zones are distributed into at least a heating region at 200 to 500° C., a high-temperature maintaining region and a cooling region at not higher than 400° C., and the oxidative decomposition of the organic components may be carried out in the cooling region, if desired. Since the oxidative decomposition is performed in the cooling region at not more than 400° C., removal of organic gas contained in an atmosphere inside the firing zones is ensured, whereby the hot air circulating inside the respective firing zones is surely prevented from containing the organic components.

The present invention also provides an apparatus for manufacturing a plasma display panel (PDP) in which the apparatus has a plurality of firing zones, a PDP under manufacture is carried into the plurality of firing zones, and a firing step and/or a drying step is performed in the plurality of firing zones, the apparatus comprising: circulating means for circulating hot air supplied in the respective firing zones; and oxidizing means for oxidatively decomposing, in a path for circulating the hot air, organic components generated in the firing step and/or the drying step.

In the apparatus of the present invention, the oxidizing means may oxidatively decompose the organic components in the presence of a catalyst, if desired.

Further, in the apparatus of the present invention, the plurality of firing zones are distributed into at least a heating region at 200 to 500° C., a high-temperature maintaining region and a cooling region at not higher than 400° C., and the oxidizing means may oxidatively decompose the organic components in the heating region, if desired.

Still further, in the apparatus of the present invention, the plurality of firing zones are distributed into at least a heating region at 200 to 500° C., a high-temperature maintaining region and a cooling region at not higher than 400° C., and the oxidizing means may oxidatively decompose the organic components in a cooling region, if desired.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Embodiment 1

Figure 2:
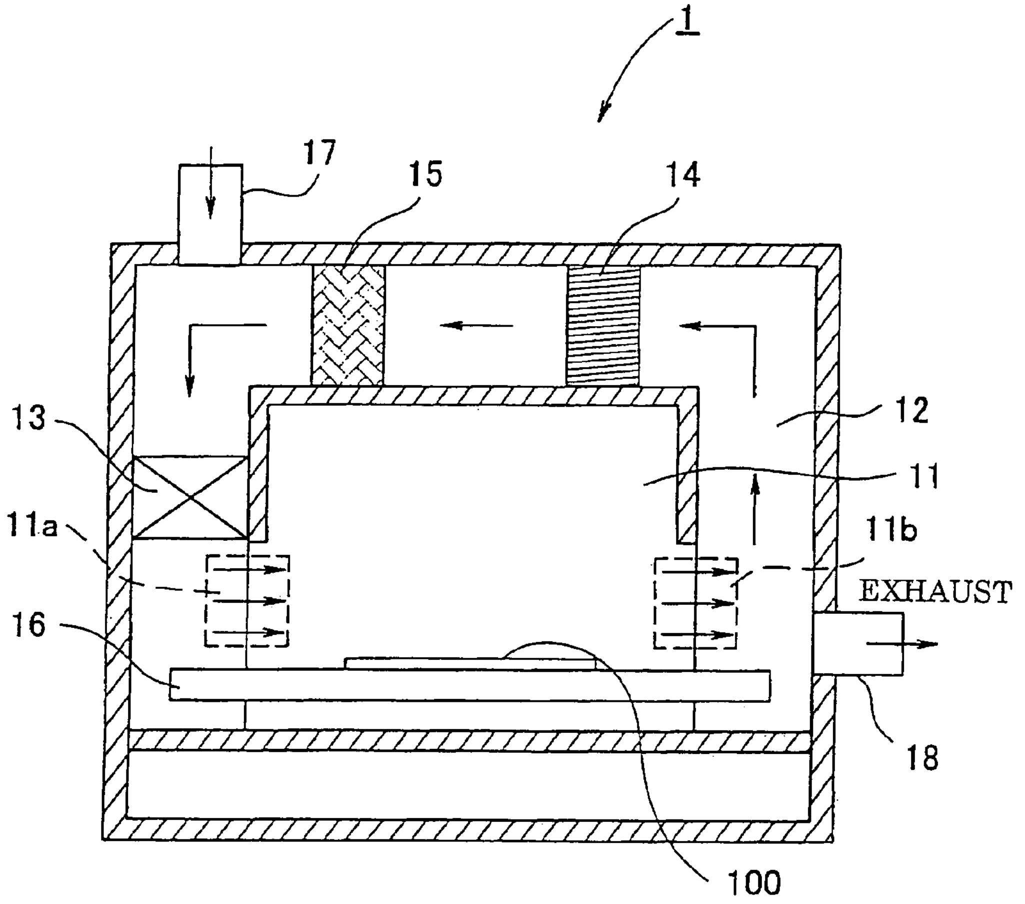
FIG. 2 is a sectional view taken along line I—I in FIG. 1.
Figure 3:
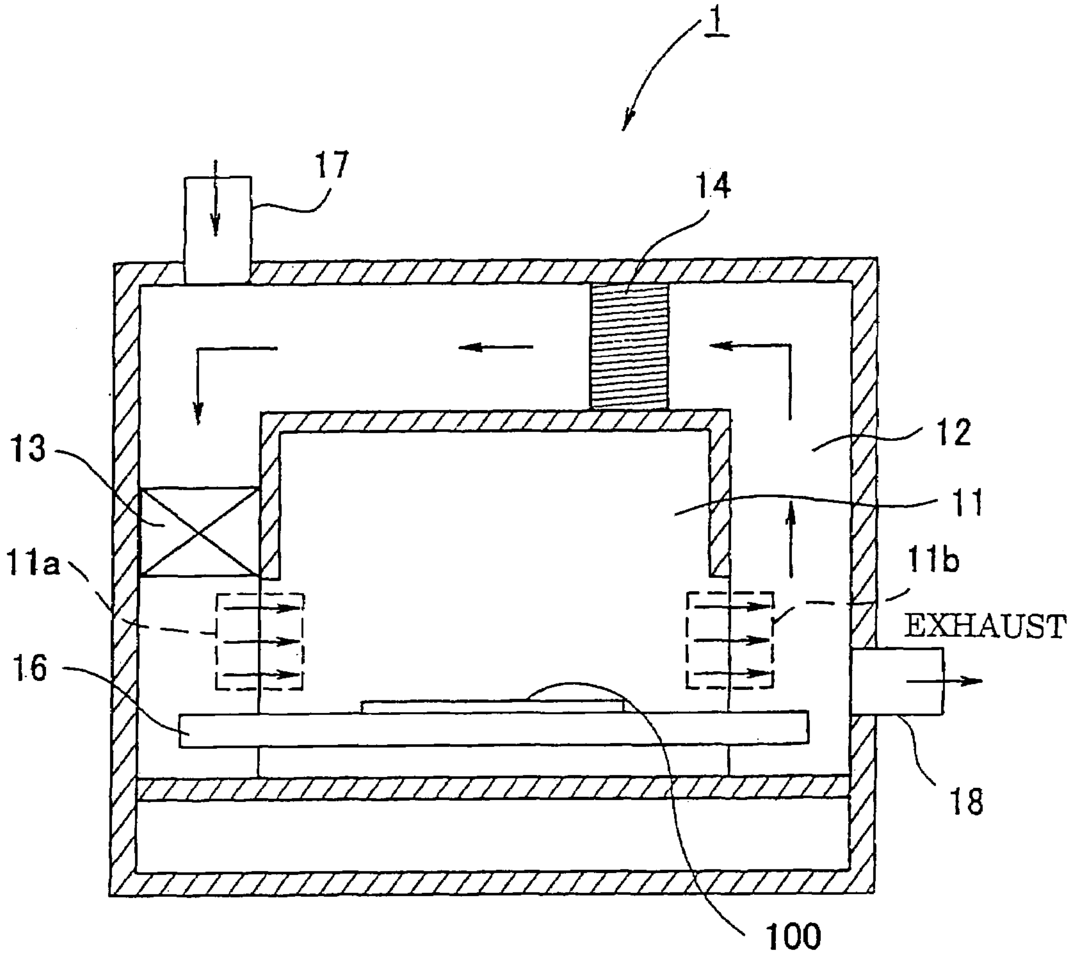
FIG. 3 is a sectional view taken along line II—II in FIG. 1.
Figure 4:
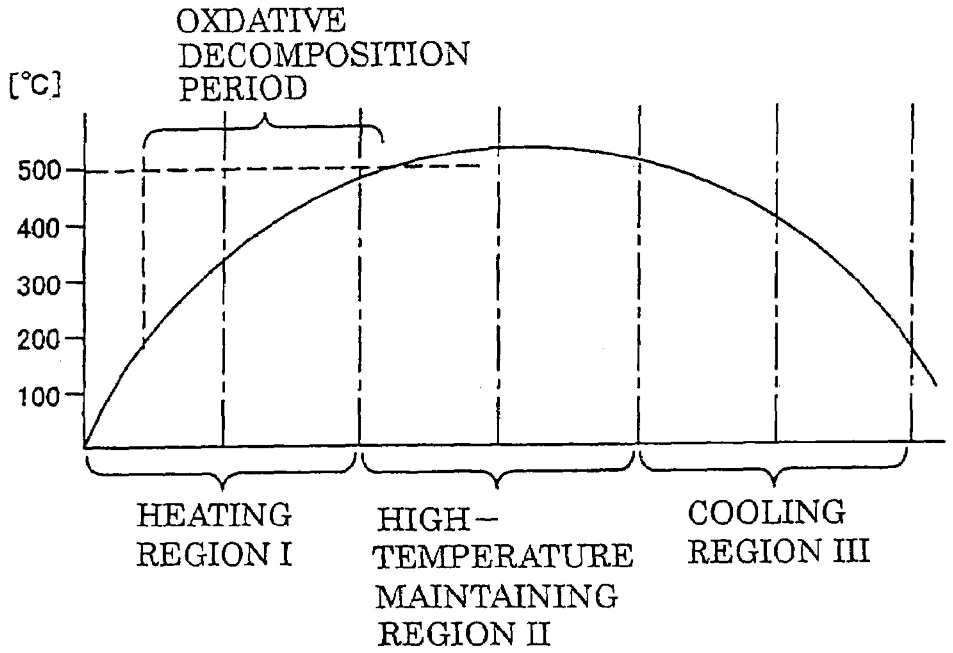
FIG. 4 a diagram showing a temperature distribution in each region of the apparatus of FIG. 1.

Referring to FIGS. 1 to 4, an apparatus and method for manufacturing a PDP according to a first embodiment of the invention will be described hereinafter. FIG. 1 is a schematic view illustrating an overall construction of the PDP manufacturing apparatus according to the first embodiment of the invention. Further, FIGS. 2 and 3 are sectional views taken along line I—I and II—II, respectively, in FIG. 1. FIG. 4 is a diagram showing a temperature distribution in each region of the apparatus of FIG. 1.

In the above-mentioned figures, the PDP manufacturing apparatus according to the first embodiment of the invention is a firing oven. The firing oven includes a plurality of firing zones 1 (for example, six firing zones as shown in FIG. 1) distributed into at least a heating region I, a high-temperature maintaining region II, and a cooling region III. Each of these firing zones 1 is independent of one another and allows hot air to circulate therein by forced convection.

The respective firing zones 1 include a chamber 11 for housing a flat glass substrate 100 of a PDP to be fired or dried therein, a circulation path 12 for circulating hot air through the chamber 11, a heater 13 provided in the circulation path 12 for generating hot gas to be sent to the chamber 11, a fan 14 for circulating the heater-generated hot gas in the circulation path 12 by forced convection, and a oxidizing means 15 provided between the heater 13 and the fan 14 in the circulation path 12 for oxidatively decomposing an organic component generated by firing or drying the flat glass substrate 100 in the chamber 11. The oxidizing means 15 uses a catalyst as an active component for promoting oxidative decomposition. Examples of the catalyst include platinum (Pt), rhodium (Rh), palladium (Pd), $Al_2O_3$, $CeO_2$, NiO, $Fe_2O_3$, and MnO.

The chamber 11 includes a supply port 11$a$ for supplying clean hot gas from the circulation path 12 into the chamber 11, and an exhaust port 11$b$ for exhausting the hot gas polluted with the organic component which is generated after the firing or drying of the flat glass substrate 100. The circulation path 12 has an inlet 17 provided between the heater 13 and the oxidizing means 15 for taking in fresh air, and an outlet 18 located posterior to the exhaust port 11*b* for exhausting part of the polluted hot gas.

Further, the firing zones 1 have a roller 16 provided through the lower part of the chamber 11 of each firing zone for conveying the flat glass substrate 100 loaded thereon. The roller 16 is provided through the lower part of the respective firing zones while the respective firing zones are communicated with the adjacent firing zones. The roller 16 conveys the flat glass substrate 100 sequentially from the foremost firing zone on the entrance side of the apparatus (located on the left side of FIG. 1) to the following firing zones for firing or drying of the glass substrate 100.

Next, the operation of the PDP manufacturing apparatus according to the first embodiment of the invention will be described in connection with the above constitution of the apparatus. First, the flat glass substrate 100 is carried into the foremost firing zone, and clean hot gas heated by the heater 13 is supplied to the chamber 11 to start the firing or drying of the glass substrate 100. In the firing zones 1 of the heating region I, the glass substrate 100 is heated to near 500° C. by the clean hot gas heated by the heater 13. Then, the glass substrate 100 is conveyed by the roller 16 to the following firing zones of the high-temperature maintaining region II.

At the firing or drying of the glass substrate 100 in the firing zones 1 of the heating region I, binder resin contained in a dielectric layer, barrier ribs, phosphor layer, or sealing frit is evaporated to become organic gas (CxHyOz). The organic gas is mixed with the hot gas and exhausted as polluted hot gas from the exhaust port 11*b*. Part of this polluted hot gas is discharged to the outside from the outlet 18, and the rest of the polluted hot gas is introduced into the oxidizing means 15 through the circulation path 12 by the fan 14.

During operation period of the heating region I at 200 to 500° C. as shown in FIG. 4, the oxidizing means 15 can oxidatively decompose the polluted hot gas introduced therein to carbon dioxide and water using the catalyst. While the polluted hot gas is decomposed, the temperature is increased by reaction heat generated by the decomposition. The clean hot gas generated by decomposition of the organic component is mixed with fresh air introduced from the inlet 17, and then heated again by the heater 13 to be supplied into the chamber 11.

In general, the polluted hot gas is oxidatively decomposed into non-toxic/odorless gas by heating the gas to a high temperature of about 500° C. or higher. However, the use of the catalyst for oxidative decomposition such as the above-mentioned platinum and palladium at the firing allows for, even at a gas temperature of 500° C. or lower, oxidative decomposition of about the same decomposition level as that of direct burning.

Where the catalyst is used in the oxidative decomposition, oxygen and the organic components adhere to the catalyst and become activated, whereby combustible substances of the organic components are burned at a low temperature (oxidatively decomposed) to make the organic components non-toxic.

The catalyst for oxidative decomposition is composed of a ceramic surface, which is called a washcoat, having a large surface area greater than 100 $m^2/g$ and fine particles of a catalyst component having a size of about 100 Å dispersed on the washcoat. More specifically, an Fe—Cr—Al stainless structure called a metal honeycomb is covered by a washcoat to make a supporter, and the fine particles of the catalyst are dispersed to and supported by the supporter to prepare a metal honeycomb catalyst. The metal honeycomb catalyst thus prepared can be utilized as the catalyst for oxidative decomposition.

Such a particulate noble-metal catalyst component having a high dispersibility has special physical properties on its surface, and thus the organic components can be oxidatively decomposed at a low temperature on this surface of the particulate catalyst component.

In addition to the above-mentioned metal honeycomb structure, the supporter for supporting the catalyst may be in the form of a pellet, a ceramic honeycomb, a metal ribbon or a foam metal.

The catalyst supporter supporting the dispersed catalyst fine particles may be provided by itself or as a catalytic unit depending on the sectional shape of the circulation path.

Where the catalyst is utilized by itself, a plurality of said catalyst supporters of a standard size can be stacked for treating a large volume of gas. When the surface of the supporter is deteriorated by masking, the supporter can be washed with water in various ways.

Where the catalyst is utilized in the catalytic unit, the catalytic unit may be a pre-heat type unit or an electric-heat type unit.

The pre-heat type unit is a catalytic unit in which gas heated by a sheathed heater passes through the catalyst. This unit can be used in a gas atmosphere containing a large amount of moisture.

The electric-heat type unit is a catalytic unit in which an electric current is directly supplied to a stainless supporter so that the supporter is self-heated to perform its catalytic function. Use of this unit allows for an improved thermal efficiency and a higher reaction efficiency.

As described above, the oxidative decomposition of the polluted hot gas by the oxidizing means 15 prevents reduction in the amount of the hot gas to be supplied in the respective firing zones and reduction in heat energy of the hot gas. Further, part of the polluted hot gas is discharged to the outside and only the rest of the polluted gas is oxidatively decomposed in the oxidizing means. The clean hot air treated by the oxidized means 15 is mixed with fresh air introduced from the inlet 17. This minimizes the amount of the polluted gas to be treated by the oxidizing means and reduces the heat energy required for heating at the heater 13.

Embodiment 2

Figure 5:
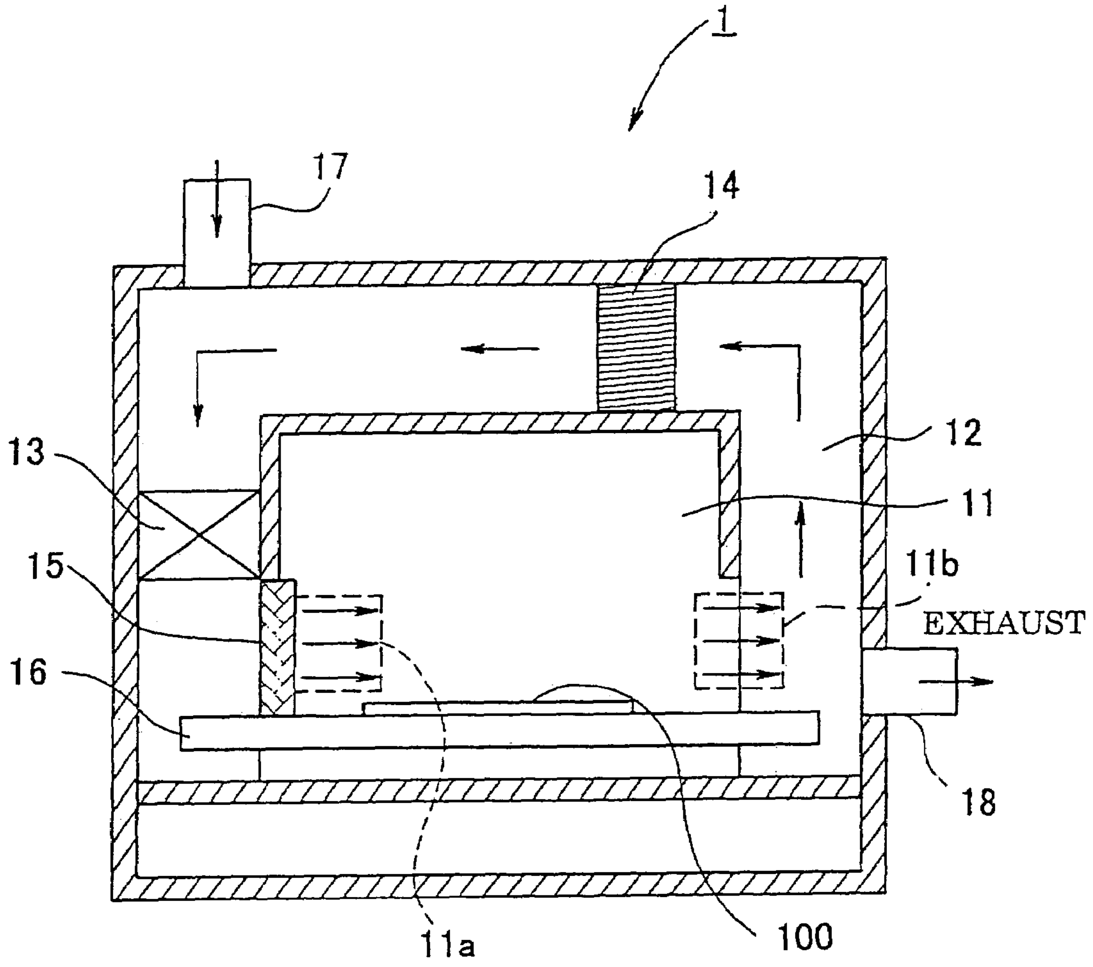
FIG. 5 is a sectional view illustrating a PDP manufacturing apparatus according to a second embodiment of the invention.

FIG. 5 is a sectional view illustrating a PDP manufacturing apparatus according to a second embodiment of the invention. As in the first embodiment, the respective firing zones 1 include the chamber 11, circulation path 12, heater 13, fan 14, oxidizing means 15, roller 16, inlet 17, and outlet 18. According to the second embodiment of the invention, the oxidizing means 15 is located posterior to the heater 13.

With this arrangement of the oxidizing means 15, the polluted hot gas can be introduced in the oxidizing means after it is heated to a very high temperature by the heater 13, allowing the oxidative decomposition in the oxidizing means 15 to be efficiently conducted at high temperature.

Embodiment 3

Figure 6:
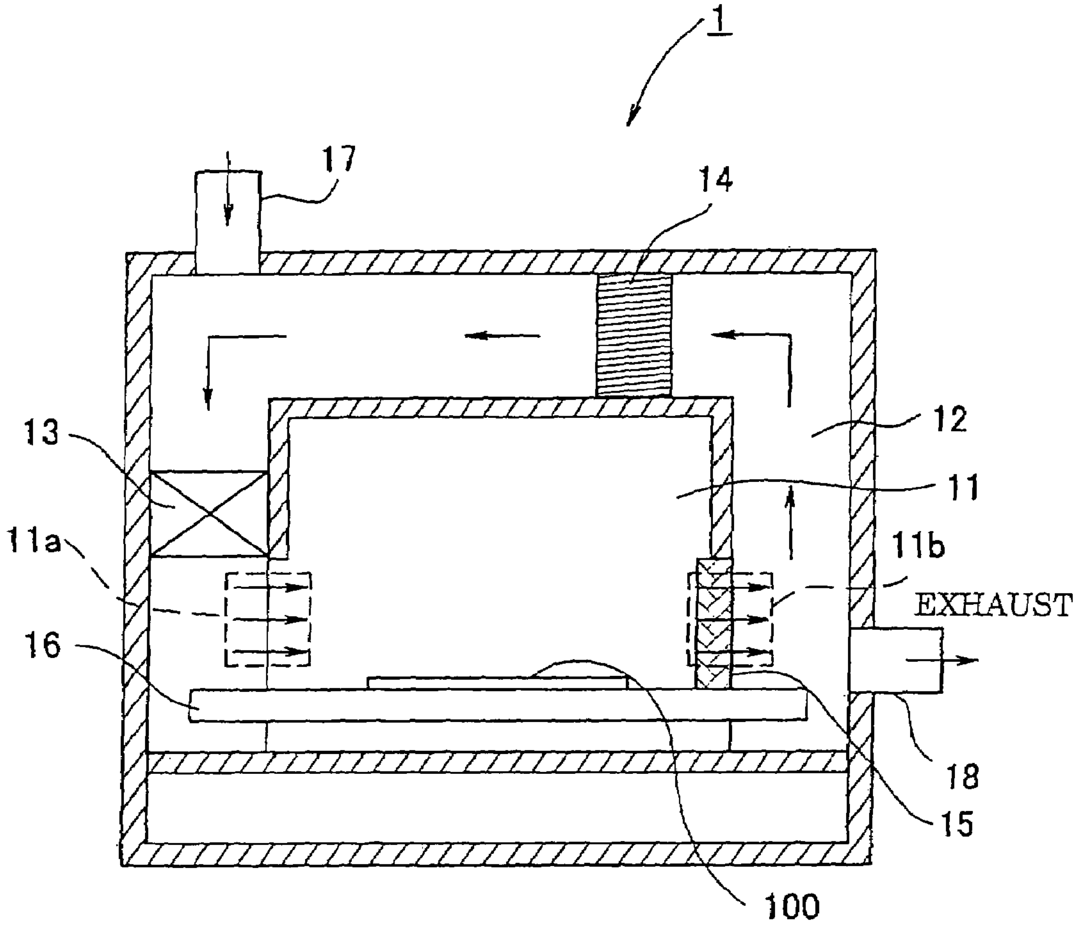
FIG. 6 is a sectional view illustrating a PDP manufacturing apparatus according to a third embodiment of the invention.
Figure 7:
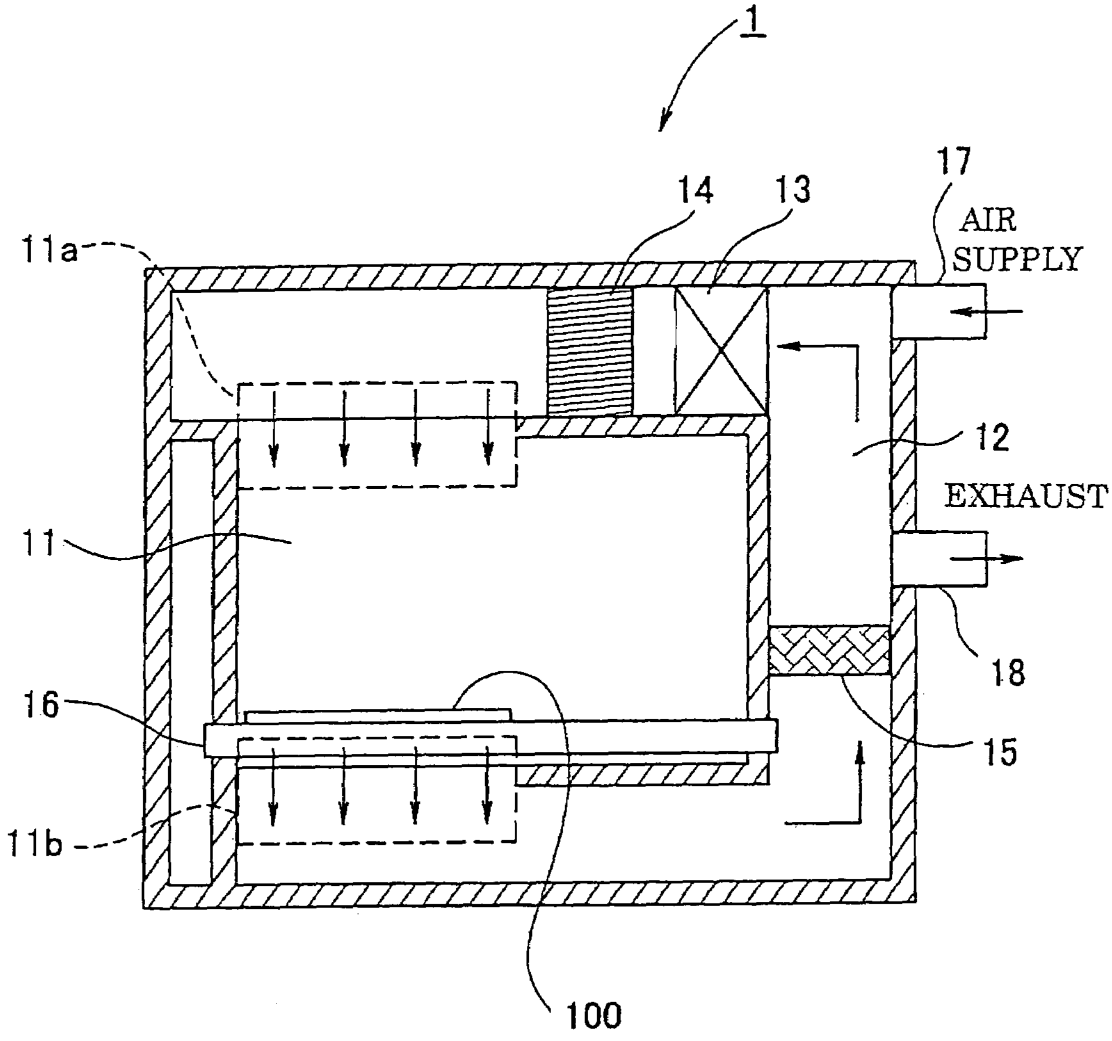
FIG. 7 is a sectional view illustrating a PDP manufacturing apparatus according to the third embodiment of the invention.
Figure 8:
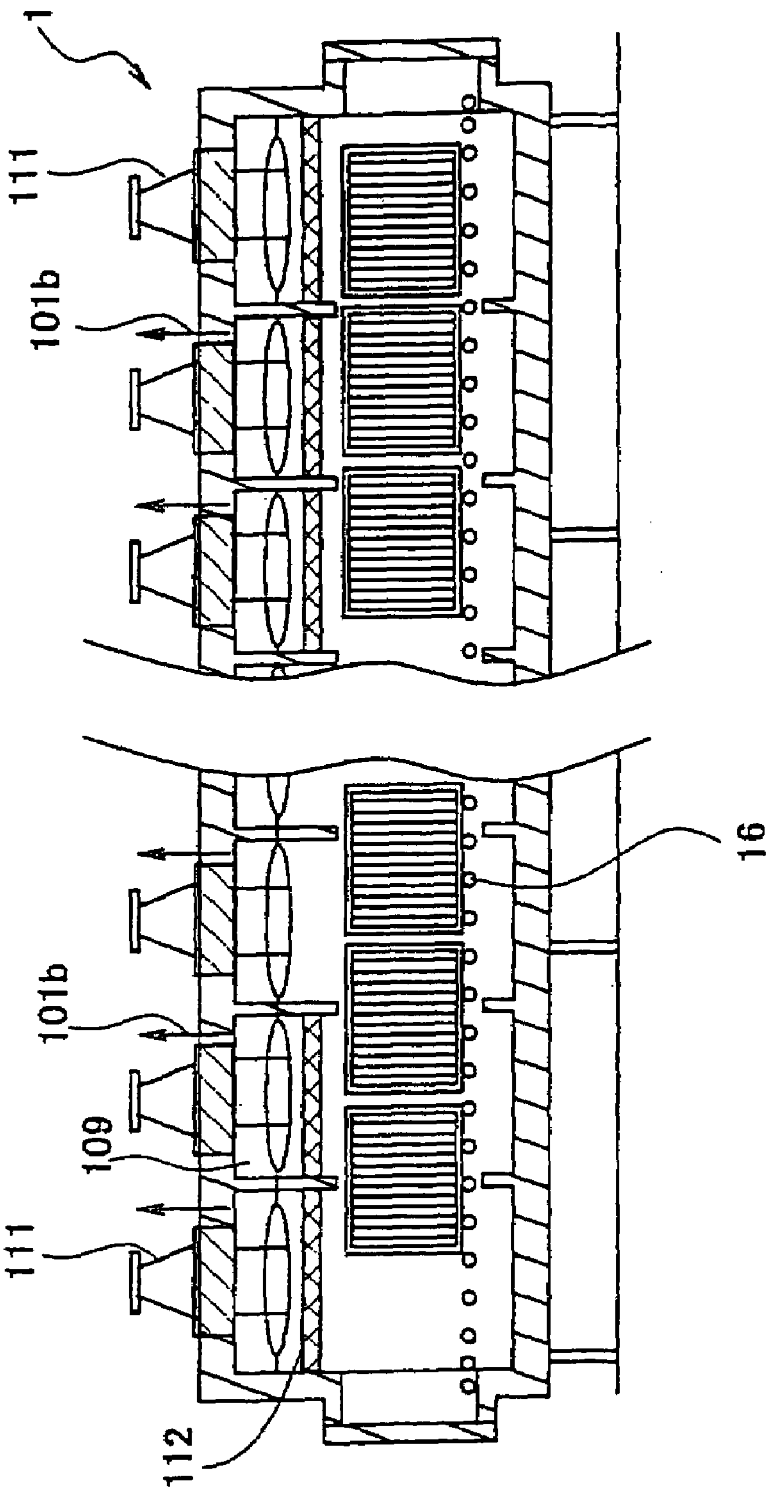
PRIOR ART FIG. 8
FIG. 8 is a view illustrating an overall construction of a conventional continuous firing oven for flat glass substrates.
Figure 9:
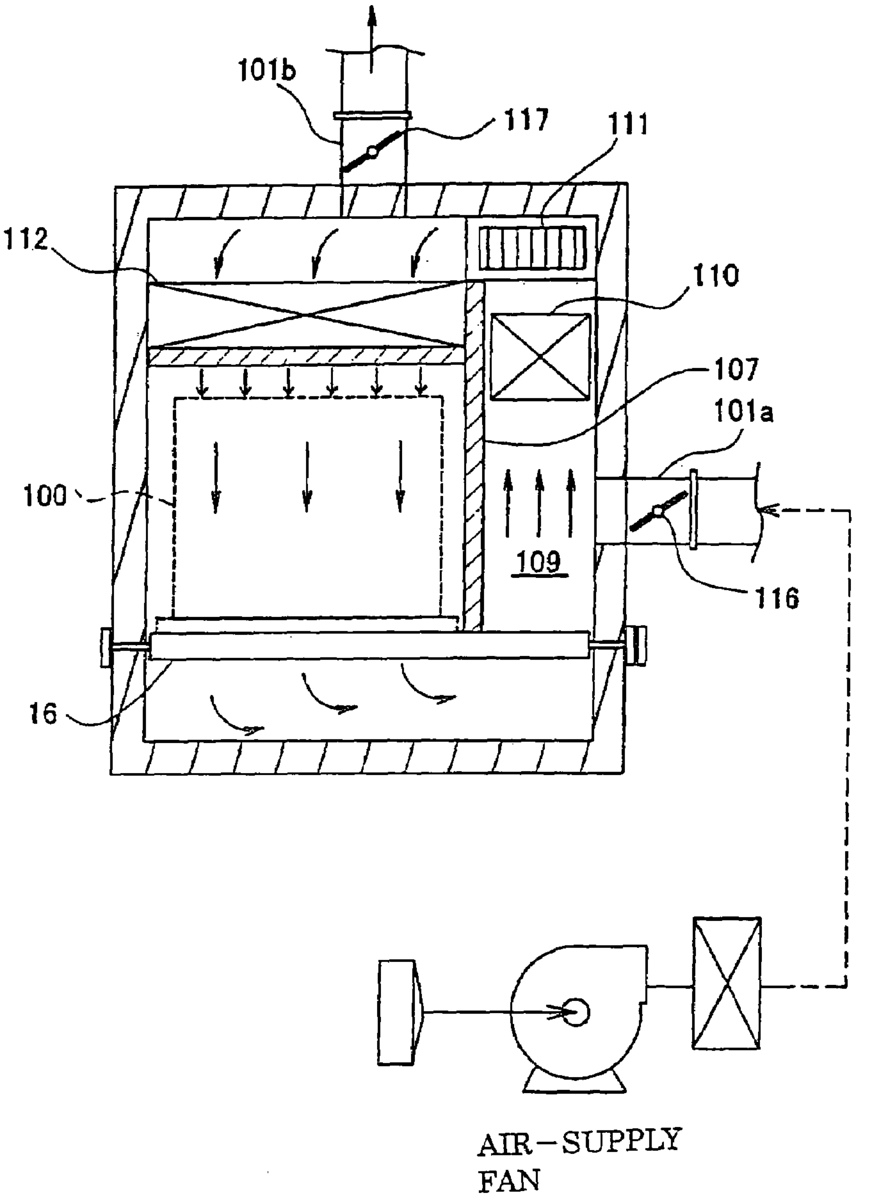
PRIOR ART FIG. 9
FIG. 9 is a sectional view illustrating the conventional continuous firing oven for flat glass substrates of FIG. 8.

FIGS. 6 and 7 are sectional views illustrating a PDP manufacturing apparatus according to a third embodiment of the invention. As in the first embodiment, the respective firing zones 1 include the chamber 11, circulation path 12, heater 13, fan 14, oxidizing means 15, roller 16, inlet 17, and outlet 18. According to the third embodiment of the invention, the oxidizing means 15 is provided between the exhaust port 11*b* of the chamber 11 and the outlet 18.

With this arrangement of the oxidizing means 15, the polluted hot gas containing the organic component generated inside the chamber 11 can be cleaned in the oxidizing means 15, allowing the cleaned hot gas to be discharged from the outlet 18 and circulated through the circulation path 12 by forced convection.

Other Embodiments

According to the embodiments described above, the glass substrate 100 is loaded directly on the roller 16 provided through the respective firing zones 1 which are communicated with the adjacent firing zones. Alternatively, the glass substrate 100 may be supported on a plane by a surface plate or on points by a plurality of pins. Alternatively, the glass substrate 100 may be supported on lines by a plurality of linear supporting members.

According to the above embodiments, the glass substrate 100 is loaded singly on the roller 16. Alternatively, a plurality of said glass substrates 100 may be placed in a rack etc. and loaded on the roller 16 at predetermined intervals.

Further, according to the above embodiments, the oxidizing means 15 is provided in the firing zones 1 of all three regions I, II, and III. However, the oxidizing means 15 is preferably provided in the firing zones 1 of the heating region I at 200 to 500° C. Alternatively, the oxidizing means 15 may be provided in the firing zones 1 of the cooling region III at 400° C. or may be provided in the firing zones 1 of the high-temperature maintaining region II.

Still further, according to the above embodiments, the oxidative decomposition is carried out in the oxidizing means provided for removing the organic gas generated at the firing or drying. In addition to the oxidizing means, a heat-resistant filter may be provided for removing particles of predetermined size. In that case, the oxidizing means may be located posterior to the heat-resistant filter in the circulation path so that inhibition of the oxidative decomposition caused by the particles is reduced to a minimum level.

In accordance with the present invention, the organic component generated at the drying and/or firing of the dielectric layer, barrier ribs, phosphor layer, sealing frit and the like of a PDP is oxidatively decomposed, thereby allowing the organic component to be removed without reducing the amount of hot air supplied in the firing zones (i.e., increasing a hot air supply pressure) and decreasing the heat energy of the hot air.

Since the oxidative decomposition of the organic component is performed by the reaction of catalyst, a further catalysis is promoted under high temperature conditions in both the firing and drying steps, and thereby the decomposition and removal of the organic component are efficiently conducted.

Further, since the oxidative decomposition of the organic component is carried out in the heating region at 200 to 500° C., the organic component is removed when it is generated the most. This prevents decrease in firing efficiency caused by the organic component in the high-temperature maintaining region and the cooling region.

Still further, since the oxidative decomposition of the organic component is carried out in the cooling region at not more than 400° C., the removal of the organic gas contained in an atmosphere inside the firing zones is ensured. This prevents the hot air circulating inside the respective firing zones from being contaminated with the organic component.

What is claimed is:

1. An apparatus for manufacturing a plasma display panel (PDP) in which a PDP under manufacture is carried into the apparatus, the apparatus comprising:

a plurality of regions, each region comprising a plurality of firing zones, and each firing zone comprising a chamber therein for housing a glass substrate to be fired, wherein firing and/or drying the glass substrate is performed in the plurality of firing zones;

circulating means forming a circulation path within each of the firing zone through, inside and outside of the respective chambers, for circulating hot air supplied in the respective chambers; and a catalyst provided in each circulation path of the firing zones in at least one of the regions, for oxidatively decomposing organic components generated when firing and/or drying the glass substrate.

2. The apparatus of claim 1, wherein the plurality of firing zones are distributed into at least a heating region at 200 to 500°, a high-temperature maintaining region and a cooling region at not higher than 400°, and the oxidizing means oxidatively decomposes the organic components in the heating region.

3. The apparatus of claim 1, wherein the plurality of firing zones are distributed into at least a heating region at 200 to 500°, a high-temperature maintaining region and a cooling region at not higher than 400°, and the oxidizing means oxidatively decomposes the organic components in the cooling region.

4. The apparatus of claim 1, wherein the catalyst is an oxidation catalyst selected from the group consisting of platinum, rhodium, palladium, aluminum oxide, ceric oxide, nickel oxide, iron oxide, manganese oxide, and their mixtures.

5. An apparatus for firing a glass substrate of a PDP comprising:

a firing oven of an air-tight structure having an inlet and an outlet for air;

a chamber provided in the firing oven for housing a glass substrate to be fired, the chamber having a supply port and an exhaust port for air opened into the firing oven;

a heater provided between the inlet and the supply port for heating the air taken in through the inlet to generate hot gas;

a fan provided in the oven to form a circulation path for circulating the heater-generated hot gas in the chamber by sending the heater-generated hot gas into the chamber through the supply port and then out of the chamber through the exhaust port; and a catalyst provided in the circulation path in such a manner as to cross the circulation path, for oxidately decomposing organic components generated from the glass substrate during a firing process of the glass substrate.

6. An apparatus comprising:

a firing oven comprising:

a chamber for housing a glass substrate to be fired or dried therein, the chamber having a supply port to supply air into the chamber and an exhaust port to exhaust air from the chamber;

a circulation path which circulates air around an external perimeter of the chamber and inside of the chamber, and comprising an inlet and an outlet to respectively supply air into the chamber and exhaust air from the chamber;

a heater positioned between the inlet and the supply port, to heat air supplied through the inlet and to generate hot gas to be supplied into the chamber through the supply port;

a fan to circulate the hot gas along the circulation path; and a catalyst positioned within the circulation path to oxidatively decompose organic components generated by firing or drying the glass substrate in the chamber, wherein the catalyst is positioned between the fan and the heater within the circulation path.

7. The apparatus of claim 6, wherein the hot gas is supplied into the chamber from the heater and mixed with the organic components generated therein, to produce a polluted hot gas, and a portion of the polluted hot gas is exhausted through the exhaust port while a remaining portion is circulated by the fan and supplied to the catalyst to be oxidatively decomposed.

8. The apparatus of claim 6, wherein the firing oven comprises a plurality of firing zones arranged in series, adjacent to each other, each firing zone comprising a roller in a lower part thereof, to allow the firing zones to communicate with each other.

9. The apparatus of claim 8, further comprising a plurality of regions, wherein the firing zones are distributed into one of a heating region, a high-temperature region and a cooling region.

* * * * *

UNITED STATES PATENT AND TRADEMARK OFFICE

CERTIFICATE OF CORRECTION

PATENT NO. : 7,118,441 B2
APPLICATION NO. : 10/914240
DATED : October 10, 2006
INVENTOR(S) : Motonari Kifune et al.

It is certified that error appears in the above-identified patent and that said Letters Patent is hereby corrected as shown below:

Column 8, Line 16, change “500°,” to --500° C,--.

Column 8, Line 17, change “400°,” to --400° C,--.

Column 8, Line 22, change “500°,” to --500° C,--.

Column 8, Line 23, change “400°,” to --400° C,--.

Column 8, Line 47, change “oxidately” to --oxidatively--.

Column 9, Line 11, change “por” to -- por- --.

Signed and Sealed this

Sixth Day of March, 2007

JON W. DUDAS

*Director of the United States Patent and Trademark Office*